Figure 2:
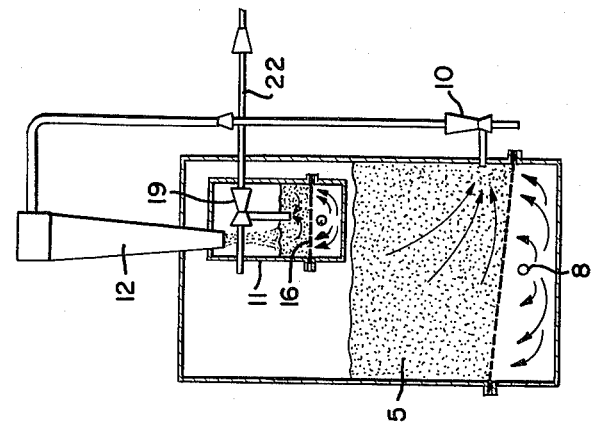

United States Patent [19]
Bois

[11] 3,909,956
[45] Oct. 7, 1975

[54] DEVICE FOR PRODUCING A CONSTANT-LEVEL FLUIDIZED BED OF PULVERULENT OR GRANULAR PRODUCTS

[75] Inventor: Roger Bois, La Celle Saint-Cloud, France

[73] Assignee: Drysys Equipment S.A., France

[22] Filed: Nov. 30, 1973

[21] Appl. No.: 420,462

[30] Foreign Application Priority Data
Jan. 25, 1973  France .......................... 73.02578

[52] U.S. Cl. ........................... 34/57 R; 34/57 A
[51] Int. Cl. ................................ F26b 17/10
[58] Field of Search ...... 34/10, 57 R, 57 A; 432/15, 432/58; 222/56, 195

[56] References Cited
UNITED STATES PATENTS

| | | | |
|---|---|---|---|
| 2,490,993 | 12/1949 | Borcherding | 34/10 |
| 2,721,118 | 10/1955 | Accaries | 34/10 X |
| 3,255,921 | 6/1966 | Eveson et al. | 222/195 X |
| 3,494,046 | 2/1970 | Harkreader | 34/10 |
| 3,648,380 | 3/1972 | Guilloud | 34/10 |

*Primary Examiner*—Charles J. Myhre
*Assistant Examiner*—William C. Anderson
*Attorney, Agent, or Firm*—Wenderoth, Lind & Ponack

[57] ABSTRACT

Produces a constant-level fluidized bed of product. It comprises a product storage tank provided with means for fluidizing the product in the tank and means for taking off the fluidized product. A tank for regulating the concentration of the product is connected to the storage tank through the take-off means and is provided with second fluidizing means and take off means for connection to projecting devices. Overflow means associated with the regulating tank permits the overflow product to return to the storage tank.

6 Claims, 2 Drawing Figures

U.S. Patent Oct. 7, 1975 3,909,956

DEVICE FOR PRODUCING A CONSTANT-LEVEL FLUIDIZED BED OF PULVERULENT OR GRANULAR PRODUCTS

The present invention relates to a device for producing a fluidized medium in a tank storing a pulverulent product.

It is more particularly related to such a device whereby it is possible to produce a fluidized medium having a constant level and concentration irrespective of the consumption of powder or granules from the storage tank.

It is important, especially in the field of painting by the projection of pulverulent products to have available a mixture of air and powder whose concentration is constant, irrespective of the amount of powder in the storage tank.

It is known to transport the powder from a tank to an applicator by way of a venturi device which draws the powder from a fluidized medium.

It is also known to gravity-feed this fluidized medium from hopper-tanks equipped with vibrators. Such a device has uneven flow due the clodding of the powders or granules, the grain shape of which is a very important factor in the obtainment of a good evenness of flow.

Powder tanks exist moreover which are under pressure or communicate with the free air and in which the powder is fully fluidized and is drawn off by way of a venturi device or any other means.

It is clear that in the last-mentioned device, the tank is always of finite dimensions and the height of fluidization drops as the powder contained in the tank is consumed. This produces a variation in the concentration at the point at which the powder is taken off and consequently a variation in the rate of flow of extracted powder.

An object of the invention is to depart completely from considerations of the flowability of the granular powder in hoppers and to achieve a perfectly controlled constant-level fluidized medium from which it is possible to take off the product in suspension in perfectly predetermined and constant proportions irrespective of the level of the product in the storage tank.

The invention provides a device for producing a constant-level fluidized bed of pulverulent or granular product, comprising a product storage tank provided with first means for fluidizing the product in the tank and first means for taking off the fluidized product, a tank regulating the concentration of the pulverulent product and second product fluidizing means and second product taking off means capable of being connected to projecting devices, said regulating tank being connected to the storage tank through take off means and also communicating with the storage by way of overflow means adapted to govern the level of the product.

The device according to the invention is of particular interest when it is employed for applying powder by an electrostatic process or other process in which the evenness of the flow of powder supplied to the applicator is a prime factor in the achievement of a constant quality of application.

Further features and advantages of the invention will be apparent from the ensuing description with reference to the accompanying drawing.

Figure 1:
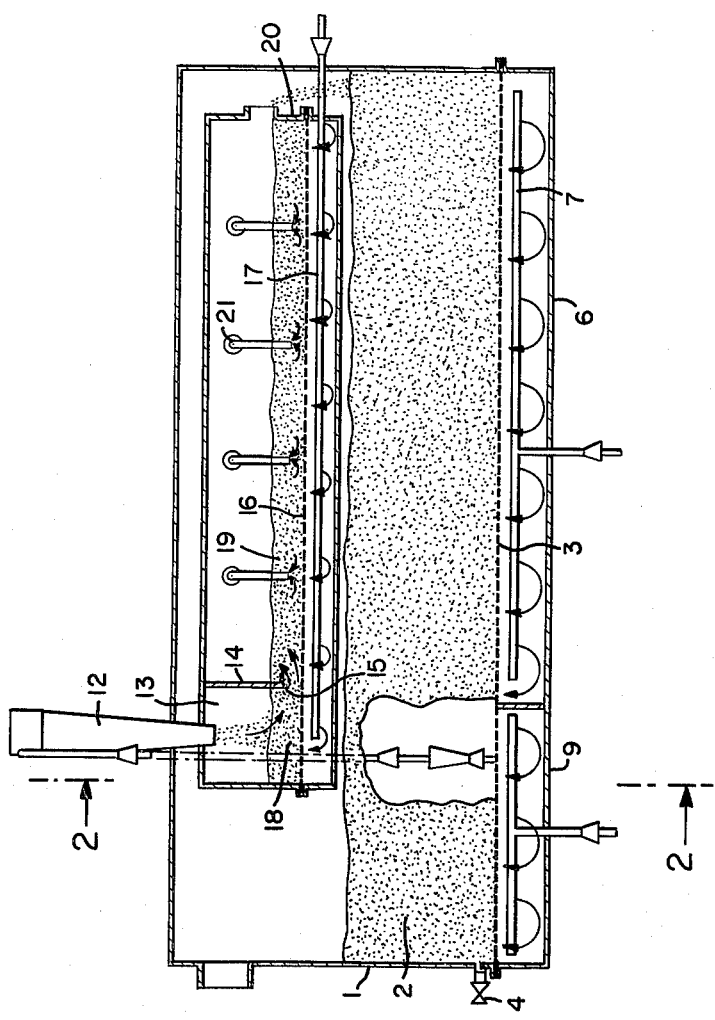

In the drawing:

FIG. 1 is a diagrammatic sectional view of a device according to the invention, and FIG. 2 is a sectional view taken on line 2—2 of FIG. 1.

FIG. 1 shows a powder storage and distributing device comprising a main tank 1 containing a store of powder 2. This tank includes in its lower part an inclined bottom wall 3.

The slope of the bottom wall 3 is such as to permit, firstly, an easy emptying of the tank through an orifice provided with a valve 4 and, secondly, a flow of the powder toward a take-off region 5 located adjacent the lowermost part of the bottom wall so as to limit the volume of powder remaining when the suction device has been deprimed.

The porous bottom 3 of the tank is mounted on a box structure 6 supplied with compressed air by way of piping 7 provided with orifices 8 directed downwardly so as to distribute the compressed fluidizing air in a homogeneous manner in the box structure.

The take-off zone 5 is supplied with fluidizing air by a fluidization box structure 9 which is separate so as to control this fluidization more strictly in the take-off region.

As can be seen in FIG. 2, a suction venturi 10 is mounted in the take-off region so as to cause the powder to rise from the storage tank 1 to an overflow tank 11 by way of a separating device such as an expansion box or a cyclone 12.

Note that the device for causing the powder to rise may also comprise mechanical means having scoops on endless belts for example, in which case, the expansion box or cyclone can be dispensed with.

The tank 11 disposed in the upper part of the storage tank 1 is consequently of much smaller size than the storage tank and adapted to receive the powder which has risen by way of the venturi 10 and the separating device 12 mounted at one end of the tank 11.

A porous bottom wall 16 placed in the lower part of the tank 11 is supplied with compressed fluidizing air by way of piping 17 of same design as the piping 7 and mounted below the bottom wall 16 in a box structure integral with the tank 11.

Calming means 13 constituted by a compartment surrounding the outlet of the separating device 12 and separated from the rest of the tank 11 by a partition wall 14 in the lower part of which is formed a passage 15 for the fluidized pulverulent material, causes the powder to pass from the bottom of the tank 11 while it isolates the turbulent part 18 from the calm part 19.

At its end opposed to the separating device 12, the tank 11 has an overflow device 20 having an adjustable overflow sill whereby it is possible to regulate the level of the powder.

This arrangement permits a continuous flow of the powder from the separating device 12 to the overflow device and thus achieves a constant level in the overflow tank.

One or more take-off venturis 21 may be disposed in the upper part of the tank 11, their outlets being connected by piping 22 to various applicators.

Note that the flow of powder from the separating device must be higher than the sum of the flows of powder from the outlet venturis.

Having now described my invention what I claim as new and desire to secure by Letters Patent is:

1. A device for producing a constantlevel fluidized bed of pulverulent or granular product comprising a product storage tank, first means for fluidizing the product in the tank, first means for taking-off the fluidized product from said storage tank, a tank regulating the concentration of the pulverulent product, said regulating tank being provided with second product fluidizing means, second product take-off means connected to said regulating tank and capable of being connected to projecting devices, said regulating tank being connected to the storage tank through the first take-off means, and overflow means adapted to govern the level of the product in the regulating tank and capable of allowing the overflow product to return to the storage tank.

2. A device as claimed in claim 1, wherein the fluidizing means provided in the regulating tank comprise a porous bottom wall disposed in the lower part of the regulating tank and piping for connection to a compressed air supply and disposed in a box structure located under said bottom wall and provided with orifices arranged along its length.

3. A device as claimed in claim 1, comprising a device for separating air from the product which is connected between the first take-off means and said regulating tank and has an outlet, partition wall disposed in the vicinity of said outlet for dividing the regulating tank into a turbulence compartment and a calm compartment, a passage interconnecting the two compartments being formed in the lower part of the partition wall above the porous bottom wall.

4. A device as claimed in claim 1, wherein the regulating tank is disposed inside the storage tank in the upper part of the storage tank.

5. A device as claimed in claim 1, wherein the overflow means of the regulating tank has an adjustable overflow sill.

6. A device as claimed in claim 1, wherein the fluidizing means of the storage tank comprise a separate fluidizing box structure adapted to strictly control the fluidization of the product in the region of the second take-off means.

* * * * *